Patented Feb. 26, 1952

2,587,279

UNITED STATES PATENT OFFICE 2,587,279

INCREASING THE MECHANICAL STABILITY OF FORMALDEHYDE - PRESERVED NATURAL RUBBER LATEX

Edward M. Bevilacqua, Ramsey, N. J., assignor to United States Rubber Company, New York, N. Y., a corporation of New Jersey No Drawing. Application February 2, 1950, Serial No. 142,082

16 Claims. (Cl. 260—820)

This invention relates to increasing the mechanical stability of formaldehyde-preserved natural rubber latex.

Natural Hevea rubber latex is commonly preserved today with ammonia. It is also known to preserve latex with formaldehyde, and this has the advantage that the solid rubber derived from formaldehyde-preserved latex is much softer than the rubber derived from ammonia-preserved latex, and this is desirable in many manufacturing processes. Rubber from ammonia-preserved latex has a Mooney viscosity of around 115 to 160, and rubber from formaldehyde-preserved latex has a Mooney viscosity of around 58 to 69, as measured at 100° C. by the Mooney shearing disc plastometer described by M. Mooney in Industrial and Engineering Chemistry, Anal. Ed. 6, 147 (1934). However, such formaldehyde-preserved latex thickens rapidly with age, and in a few months becomes too thick for direct use in manufacturing processes. Volatile secondary and tertiary amines have been added to formaldehyde-preserved latex to prevent this thickening on aging, and to give a formaldehyde-preserved latex which will remain fluid over a long period of time. However, there is still a serious disadvantage to the use of such latices in manufacturing processes because of their very low mechanical stability. The mechanical stability of formaldehyde-preserved latices, including those where there has also been added a volatile amine to maintain the requisite fluidity over a long period of time, is much lower than the mechanical stability of ammonia-preserved latices, and is too low for many commercial usages. Some conventional surface-active agents will effectively increase the mechanical stability of formaldehyde-preserved latices when used in amounts of 1% or more, but they are ineffective at low concentrations, as up to 0.2%. Other conventional surface-active agents will coagulate formaldehyde-preserved latices when used in amounts of 1% or more. All percentages and parts referred to herein are by weight. Such large amounts as 1% of added surface-active agents which will increase the mechanical stability of the latex are commercially impractical, and may impart various difficulties to the use of the latex in manufacturing operations and introduce undesirable properties to the final rubber products made from the latex.

The object of the present invention is to increase effectively the mechanical stability of formaldehyde-preserved latex without adding more than 0.2% by weight of a material based on the latex. The terms "natural rubber latex" and "latex" are used herein to designate the latex of the *Hevea brasiliensis* tree, and unless otherwise specified include normal and concentrated *Hevea brasiliensis* latex.

According to the present invention, the mechanical stability of formaldehyde-preserved latex is effectively increased by incorporating in the latex a small amount of polyethylene glycol having 10 to 200 ethyleneoxy groups in the polymer chain or an ether or an ester of such a polyethylene glycol with an aliphatic alcohol or an aliphatic acid, respectively, having not more than 10 carbon atoms.

In carrying out the present invention, 0.01% to 0.2%, based on the latex, of such polyethylene glycol or ether or ester thereof is incorporated in the formaldehyde-preserved latex, which may be normal or concentrated. The amount of formaldehyde that is added to the freshly tapped latex may be from 0.1 to 1%. The addition of the formaldehyde to the freshly tapped latex reduces the pH from about 7 to a value in the range 5.5 to 6.8 depending on the amount of formaldehyde used. The formaldehyde is distributed throughout the serum of the uncoagulated latex, and on removal of serum in the concentration of the latex as by centrifuging or chemical creaming, the formaldehyde content of the cream may be lowered to as little as 0.03%. Further formaldehyde may be added to the concentrated latex if desired. For increasing the fluidity of the latex on standing, it is sometimes desirable to also add 0.1 to 1% based on the latex of a volatile, saturated, secondary or tertiary amine, e. g. dimethylamine, trimethylamine, diethylamine, triethylamine, or morpholine. Such volatile amine may be added to the unconcentrated or concentrated latex, or may be added both before and after concentration. The pH of such lattices containing about 0.03 to 1% formaldehyde and 0.1 to 1% of volatile secondary or tertiary amine will generally be in the range of 6 to 10.5. Such volatile secondary and tertiary amines do not react in the latex with the formaldehyde as do ammonia or primary amines, and hence the latices retain the desirable property of yielding the low viscosity rubber of 58 to 69 Mooney, characteristic of formaldehyde-preserved latices, although they are still low in mechanical stability. On the other hand, the preservation of latex by the addition of formaldehyde and ammonia in amount in excess of that required to react with the formaldehyde, as in U. S. Patent 1,872,161, gives a latex of high mechanical stability, but such a latex is essentially an ammonia-preserved latex and the rubber has the usual high Mooney viscosity of around 115 to 160.

The polyethylene glycol and ethers and esters thereof used in the present invention are known materials. Polyethylene glycol has the structural formula $H(OC_2H_4)_nOH$ where $n$ is 10 to 200. Those polyethylene glycols having less than 10 ethyleneoxy groups in the polymer chain do not effectively increase the mechanical stability of formaldehyde-preserved latex when added in amounts up to 0.2% of the latex. The ethers of polyethylene glycols used in the present invention have the structural formula $$R(OC_2H_4)_nOH$$

where R represents an aliphatic radical having not more than 10 carbon atoms, and $n$ is 10 to 200. The esters of polyethylene glycols used in the present invention have the structural formula $$R-CO(OC_2H_4)_nOH$$

where R represents an aliphatic radical having not more than 9 carbon atoms, and $n$ is 10 to 200, or synonymously the formula $R(OC_2H_4)_nOH$ where R represents an acyl radical derived from an aliphatic acid having not more than 10 carbon atoms, and $n$ is 10 to 200. Generically, the polyethylene glycols and ethers and esters thereof used in the present invention may be said to have the structural formula $R(OC_2H_4)_nOH$, where R represents hydrogen or an aliphatic radical having not more than 10 carbon atoms or an acyl radical derived from an aliphatic acid having not more than 10 carbon atoms, and $n$ is 10 to 200. As is known, the polyethylene glycol ethers of aliphatic alcohols are made by reacting ethylene oxide with an alkanol, and the polyethylene glycol esters of aliphatic acids are made by reacting ethylene oxide or polyethylene glycol with an aliphatic acid. The polyethylene glycol ethers and esters of aliphatic alcohols and aliphatic acids which have more than 10 carbon atoms and which are well-known emulsifying and dispersing agents, do not effectively increase the mechanical stability of formaldehyde-preserved latex when added in amounts up to 0.2% based on the latex.

The polyethylene glycol or ether or ester thereof may be added to the latex at the plantations when the latex is initially treated with formaldehyde, with or without a volatile secondary or tertiary amine, or it may be added to such formaldehyde-preserved latex after preservation and before shipment from the plantations, or it may be added to the formaldehyde-preserved latex after arrival in the country to which it is exported. If the latex is to be concentrated, the polyethylene glycol or ether or ester thereof will generally be added after concentration to prevent waste of the material. The formaldehyde-preserved latex, which may or may not contain additional volatile secondary or tertiary amine, will have sufficient mechanical stability to withstand shipment, but it should have its mechanical stability effectively increased for use in manufacturing processes. The addition to the latex of up to 0.2% of polyethylene glycol or ether or ester thereof used in the present invention will increase the mechanical stability of the formaldehyde-preserved latex at various temperatures, as from 0° C. to 70° C. and higher. The added materials have no significant effect on properties of the latex other than effectively to increase its mechanical stability. The viscosity of the latex is not notably affected, and coagulation of the latex by salt or by acid is not hindered. Cured films of rubber made from the latex are indistinguishable from those made without addition of the polyethylene glycol or ether or ester thereof.

In the work to be described below illustrating the invention, the mechanical stability of the latices was measured by the method described in "Examination of Rubber Latex and Rubber Latex Compounds" by Jordan, Brass, and Roe, Ind. and Eng. Chem. 9, 182–198, the particular test for "Mechanical Stability" being found on pages 188 and 189. In the mechanical stability determinations, fifty milliliters of latex in a jacketed stainless steel vessel 3.8 cm. square were stirred with a propeller blade driven by a high speed Hamilton Beach motor running at 18,000 R. P. M. The temperature was kept at 25° C. Stabilities are reported in seconds, this being the number of seconds to coagulation as described in the Jordan, Brass, and Roe publication. Ammonia-preserved latices, including those latices to which there is added formaldehyde and an excess of ammonia over that required to react with the formaldehyde as in U. S. Patent 1,872,161, have mechanical stabilities greater than 400 seconds. It is not necessary to increase the mechanical stabilities of such latices.

*Example I*

A latex was preserved in Malaya by adding 0.15% of formaldehyde and 0.3% of dimethylamine, based on the latex, followed shortly by centrifuging, and then adding a further 0.3% of dimethylamine, based on the concentrated latex, giving a concentrated latex containing about 0.05% of formaldehyde and 0.4% of dimethylamine. The centrifuged latex as imported into the United States had a solids content of 63.5%, a pH of 8.5, and a mechanical stability of 120 seconds. The addition to separate portions of the concentrated latex of 0.01, 0.02, 0.05 and 0.10% of polyethylene glycol having about 90 ethyleneoxy groups in the polymer chain, increased the mechanical stability to 170, 215, 490 and 1135 seconds, respectively.

*Example II*

The addition to separate portions of the concentrated latex of Example I of 0.05% and 0.10% of polyethylene glycol having about 12 ethyleneoxy groups in the polymer chain, ncreased the mechanical stability from 120 to 285 and 470 seconds, respectively.

The addition to separate portions of the concentrated latex of Example I of 0.05% and 0.10% of polyethylene glycol having about 33 ethyleneoxy groups in the polymer chair increased the mechanical stability from 120 to 349 and 440 seconds, respectively.

The addition to the concentrated latex of Example I of 0.05% of polyethylene glycol having about 75 ethyleneoxy groups in the polymer chair increased the mechanical stability from 120 to 333 seconds.

The addition to separate portions of the centrifuged latex of Example I of 0.10% of polyethylene glycol ethers of methanol having about 12 and 17 ethyleneoxy groups in the polymer chain, increased the mechanical stability from 120 to 435 and 678 seconds, respectively.

The addition to separate portions of the centrifuged latex of Example I of 0.05% of polyethylene glycol ethers of n-octanol having about 12 and 33 ethyleneoxy groups in the polymer chain, increased the mechanical stability from 120 to 464 and 498 seconds, respectively.

The addition to separate portions of the concentrated latex of Example I of 0.05% of polyethylene glycol esters of caprylic acid having about 12, 33, 90 and 135 ethyleneoxy groups in the polymer chain, increased the mechanical stability from 120 to 375, 381, 300 and 387 seconds, respectively.

The addition to the concentrated latex of Example I of 0.05% of a polyethylene glycol ester of capric acid having about 33 ethyleneoxy groups in the polymer chain increased the stability from 120 to 367 seconds.

Example III

A latex was preserved in Malaya with 0.4% of formaldehyde and 0.3% of morpholine. It was imported into the United States where it was centrifuged, giving a solids concentration of 61.5%, a pH of 6.4, and a mechanical stability of 38 seconds. The addition to the concentrated latex of 0.05% of polyethylene glycol having about 90 ethyleneoxy groups in the polymer chain increased the mechanical stability to 260 seconds.

Example IV

A latex was preserved in Malaya by the addition of 0.15% of formaldehyde and 0.3% of morpholine, based on the latex, and was then centrifuged. To the centrifuged product were added 0.3% of formaldehyde and 0.3% of morpholine, and the concentrate was imported into the United States where it was found to have a solids concentration of 63.6%, a pH of 6.7, and a mechanical stability of 88 seconds. The addition to the concentrated latex of 0.05% of polyethylene glycol having about 90 ethyleneoxy groups in the polymer chain increased the mechanical stability to 780 seconds.

Example V

A latex was preserved in Malaya with 0.4% of formaldehyde and 0.2% of trimethylamine. It was imported into the United States where it was centrifuged, followed by addition of 0.12% of trimethylamine, based on the concentrated latex. The concentrated latex had a pH of 8.5, a solids concentration of 60.5%, and a mechanical stability of 55 seconds. The addition to the concentrated latex of 0.05% of a polyethylene glycol having about 90 ethyleneoxy groups in the polymer chain increased the mechanical stability to 395 seconds.

Example VI

This example shows that ethers and esters of polyethylene glycol with aliphatic alchols and aliphatic acids having more than 10 carbon atoms do not increase the mechanical stability of formaldehyde-preserved latices as do the chemicals used in the present invention.

The addition to the concentrated latex of Example I which had a mechanical stability of 120 seconds of 0.1% of a polyethylene glycol ether of n-dodecanol having about 23 ethyleneoxy groups in the polymer chain, gave a mechanical stability of only 136 seconds.

The addition to the latex used in Example I of 0.1% of a polyethylene glycol ether of n-octadecanol having about 20 ethyleneoxy groups in the polymer chain, gave a mechanical stability of only 150 seconds.

The addition to the latex used in Example I of 0.1% of a polyethylene glycol ester of lauric acid having about 50 ethyleneoxy groups in the polymer chain, gave a mechanical stability of only 115 seconds.

The addition to the latex used in Example I of 0.1% of a polyethylene glycol ester of oleic acid having about 50 ethyleneoxy groups in the polymer chain, gave a mechanical stability of only 65 seconds.

The addition to the latex used in Example I of 0.1% of a polyethylene glycol ester of tall oil acids having about 20 ethyleneoxy groups in the polymer chain, gave a mechanical stability of only 112 seconds.

In general, conventional anionic, cationic or non-ionic surface-active agents containing long chain hydrophobic groups do not effectively increase the mechanical stability of formaldehyde-preserved latices when added in the small amounts (0.01 to 0.2% based on the latex) used with polyethylene glycols or ethers or esters according to the present invention. For example, 0.05% of the following surface-active agents containing hydrophobic groups when added to the latex of Example I gave mechanical stabilities of less than 200 seconds, which shows the ineffectiveness of such surface-active agents to raise the mechanical stability as compared with the polyethylene glycols or ethers or esters of the present invention: dioctyl ester of sodium sulfosuccinic acid, sodium sulfate derivative of 1-ethyl-2-methyl-undecanol-4,

$C_{17}H_{33}CON(CH_3)C_2H_4SO_3Na$ alkyl naphthalene sodium sulfonates, condensation product of formaldehyde with sodium naphthalene sulfonate, stearyl dimethyl benzyl ammonium chloride, benzyl triethyl ammonium chloride, nonaethylene glycol oleate and laurate and stearate, mono- and poly-esters of sorbitan and long chain fatty acids, e.g., sorbitan monolaurate and monoleate and monostearate, and sorbitan trioleate and tristearate, and reaction products of ethylene oxide with such mono- and poly-esters of sorbitan and long chain fatty acids.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of increasing the mechanical stability of formaldehyde-preserved natural Hevea rubber latex which comprises incorporating in the latex 0.01 to 0.2% of material selected from the group consisting of polyethylene glycols having 10 to 200 ethyleneoxy groups in the polymer chain and ethers and esters of such polyethylene glycols with aliphatic alcohols and aliphatic acids having not more than 10 carbon atoms.

2. The method of increasing the mechanical stability of formaldehyde-preserved natural Hevea rubber latex which comprises incorporating in the latex 0.01 to 0.2% of polyethylene glycol having 10 to 200 ethyleneoxy groups in the polymer chain.

3. The method of increasing the mechanical stability of natural Hevea rubber latex containing 0.03 to 1% of formaldehyde which comprises incorporating in said latex 0.01 to 0.2% of material selected from the group consisting of polyethylene glycols having 10 to 200 ethyleneoxy groups in the polymer chain and ethers and esters of such polyethylene glycols with aliphatic alcohols and aliphatic acids having not more than 10 carbon atoms.

4. The method of increasing the mechanical stability of natural Hevea rubber latex containing 0.03 to 1% of formaldehyde which comprises incorporating in said latex 0.01 to 0.2% of polyethylene glycol having 10 to 200 ethyleneoxy groups in the polymer chain.

5. The method of increasing the mechanical stability of natural Hevea rubber latex containing 0.03 to 1% of formaldehyde and 0.1 to 1% of an amine of the group consisting of dimethylamine, trimethylamine, diethylamine, triethylamine, and morpholine which comprises incorporating in said latex 0.01 to 0.2% of material selected from the group consisting of polyethylene glycols having 10 to 200 ethyleneoxy groups in the polymer chain and ethers and esters of such polyethylene glycols with aliphatic alcohols and aliphatic acids having not more than 10 carbon atoms.

6. The method of increasing the mechanical stability of natural Hevea rubber latex containing 0.03 to 1% of formaldehyde and 0.1 to 1% of an amine of the group consisting of dimethylamine, trimethylamine, diethylamine, triethylamine, and morpholine which comprises incorporating in said latex 0.01 to 0.2% of polyethylene glycol having 10 to 200 ethyleneoxy groups in the polymer chain.

7. The method of increasing the mechanical stability of natural Hevea rubber latex containing 0.03 to 1% of formaldehyde and 0.1 to 1% of morpholine which comprises incorporating in said latex 0.01 to 0.2% of material selected from the group consisting of polyethylene glycols having 10 to 200 ethyleneoxy groups in the polymer chain and ethers and esters of such polyethylene glycols with aliphatic alcohols and aliphatic acids having not more than 10 carbon atoms.

8. The method of increasing the mechanical stability of natural Hevea rubber latex containing 0.03 to 1% of formaldehyde and 0.1 to 1% of morpholine which comprises incorporating in said latex 0.01 to 0.2% of polyethylene glycol having 10 to 200 ethyleneoxy groups in the polymer chain.

9. A formaldehyde-preserved natural Hevea rubber latex containing 0.01 to 0.2% of material selected from the group consisting of polyethylene glycols having 10 to 200 ethyleneoxy groups in the polymer chain and ethers and esters of such polyethylene glycols with aliphatic alcohols and aliphatic acids having not more than 10 carbon atoms.

10. A formaldehyde-preserved natural Hevea rubber latex containing 0.01 to 0.2% of polyethyleneglycol having 10 to 200 ethyleneoxy groups in the polymer chain.

11. A natural Hevea rubber latex containing 0.03 to 1% of formaldehyde and 0.01 to 0.2% of material selected from the group consisting of polyethylene glycols having 10 to 200 ethyleneoxy groups in the polymer chain and ethers and esters of such polyethylene glycols with aliphatic alcohols and aliphatic acids having not more than 10 carbon atoms.

12. A natural Hevea rubber latex containing 0.03 to 1% of formaldehyde and 0.01 to 0.2% of polyethylene glycol having 10 to 200 ethyleneoxy groups in the polymer chain.

13. A natural Hevea rubber latex containing 0.03 to 1% of formaldehyde, 0.1 to 1% of an amine of the group consisting of dimethylamine, trimethylamine, diethylamine, triethylamine and morpholine, and 0.01 to 0.2% of material selected from the group consisting of polyethylene glycols having 10 to 200 ethyleneoxy groups in the polymer chain and ethers and esters of such polyethylene glycols with aliphatic alcohols and aliphatic acids having not more than 10 carbon atoms.

14. A natural Hevea rubber latex containing 0.03 to 1% formaldehyde, 0.1 to 1% of an amine of the group consisting of dimethylamine, trimethylamine, diethylamine, triethylamine and morpholine, and 0.01 to 0.2% of polyethylene glycol having 10 to 200 ethyleneoxy groups in the polymer chain.

15. A natural Hevea latex containing 0.03 to 1% of formaldehyde, 0.1 to 1% of morpholine, and 0.01 to 0.2% of a material selected from the group consisting of polyethylene glycols having 10 to 200 ethyleneoxy groups in the polymer chain and ethers and esters of such polyethylene glycols with aliphatic alcohols and aliphatic acids having not more than 10 carbon atoms.

16. A natural Hevea latex containing 0.03 to 1% of formaldehyde, 0.1 to 1% of morpholine, and 0.01 to 0.2% of a polyethylene glycol having 10 to 200 ethyleneoxy groups in the polymer chain.

EDWARD M. BEVILACQUA.

REFERENCES CITED

The following references are of record in the file of this patent:

UNITED STATES PATENTS

| Number | Name | Date |
|---|---|---|
| 1,846,309 | Calvert | Feb. 23, 1932 |
| 1,872,161 | McGavack | Aug. 16, 1932 |
| 1,982,018 | Owen | Nov. 27, 1934 |
| 2,327,115 | Linscott | Aug. 17, 1943 |